United States Patent [19]

Martin

[11] Patent Number: 4,824,126
[45] Date of Patent: Apr. 25, 1989

[54] POWER CHUCK

[76] Inventor: Daniel P. Martin, 1150 S. Oxford, Grosse Pointe Woods, Mich. 48236

[21] Appl. No.: 849,194

[22] Filed: Apr. 7, 1986

[51] Int. Cl.⁴ .............................................. B23B 31/18
[52] U.S. Cl. ..................................... 279/1 C; 279/109
[58] Field of Search ...................... 279/15 J, 1 J, 106, 279/107, 108, 109, 118, 119, 120, 1 C

[56] References Cited

U.S. PATENT DOCUMENTS 3,423,098 1/1969 Hohwart et al. ................... 279/109
3,984,114 10/1976 Ovanin ............................ 279/1 C X

FOREIGN PATENT DOCUMENTS

P933516 3/1956 Fed. Rep. of Germany ...... 279/1 C
1209345 3/1960 France ................. 279/119
2248901 5/1975 France ................. 279/106

Primary Examiner—Z. R. Bilinsky
Attorney, Agent, or Firm—Brooks & Kushman

[57] ABSTRACT

The power chuck of the invention features a series of rocker arms which are linked by toggles to the chuck's actuator. The rocker arms are mounted on pivot pins which pivot with respect to carriers within the body of the chuck. The center of gravity of the toggle, rocker arm and jaw mounted on the end of the rocker arm is located inwardly of the pivot pin so to provide increasing clamping force as the rotational speed of the chuck increases. A spring within the carrier provides a pullback action on the workpiece during clamping.

3 Claims, 2 Drawing Sheets

FIG.2
FIG.3
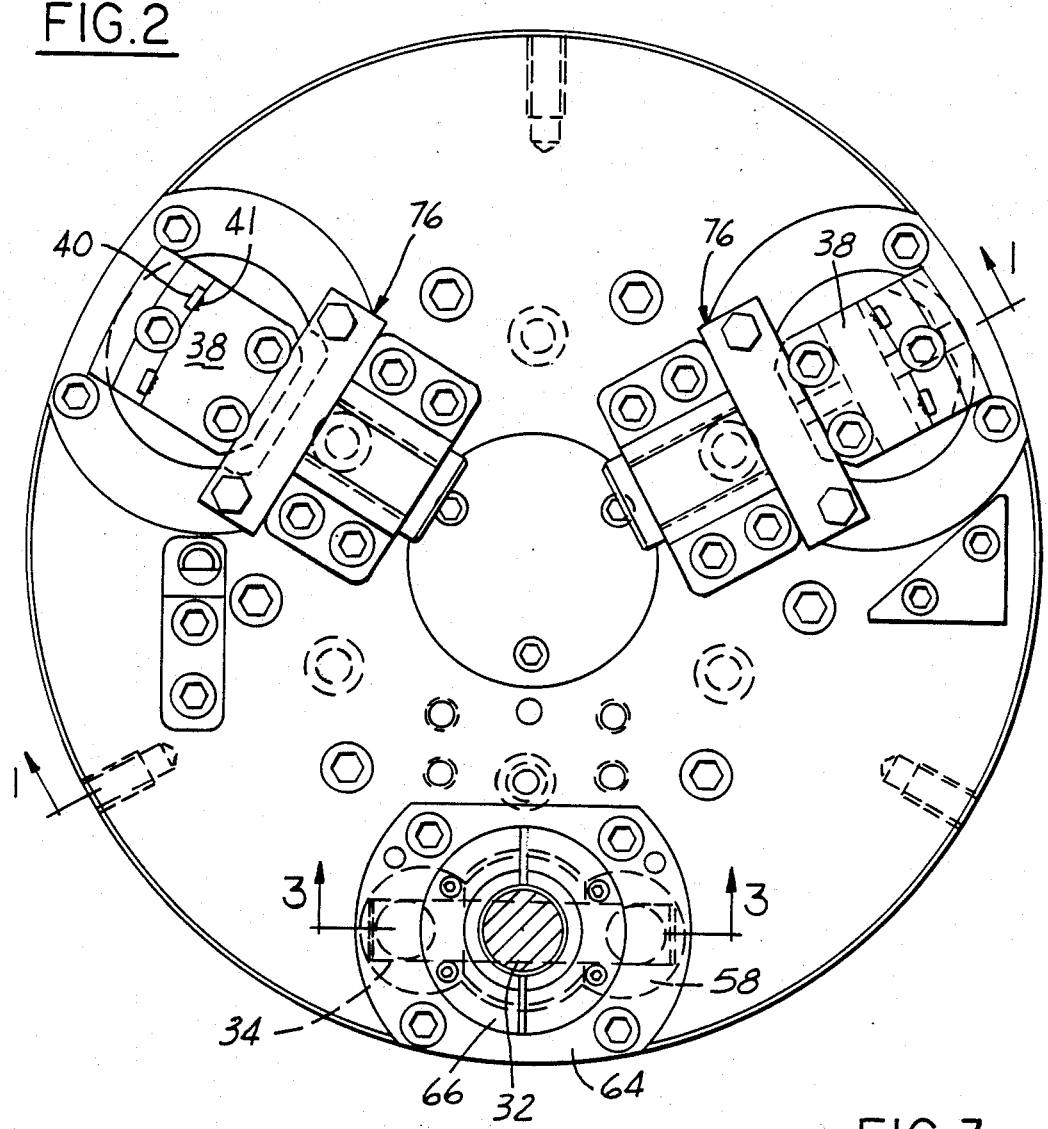
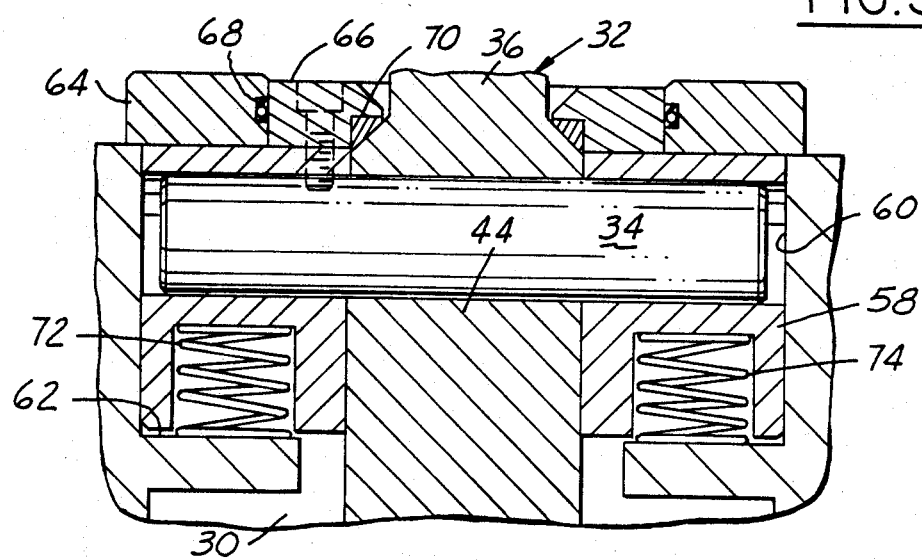

POWER CHUCK

DESCRIPTION

Field of the Invention

This invention relates to power chucks in which workpiece engaging jaws are mounted on rocker arms which are in turn toggled to a draw bar actuator. This results in the clamping pressure being a multiple of the air or hydraulic input.

The primary example of the prior art in this area of chucks is shown in U.S. Pat. No. 3,423,098. The prior art has made use of the jaw being mounted on a pivoting ball joint. While this arrangement has worked well in the field it suffers from a number of disadvantages, among them are that the ball joint allows torsional forces on the jaw to be transmitted through the ball joint through the linkage. Further the ball joint is subject to contamination. Finally, the centrifugal forces working on the jaw tend to make the jaw open up at higher speeds.

In response to these disadvantages in the prior art and for other advantages which will become apparent, the chuck of this invention was developed. This chuck features replacement of the ball joint pivot with a pin pivot which may be mounted on a movable carrier. Further, the chuck's toggle-rocker arm-jaw combination has a center of gravity inward of its pivot to the chuck body so that during rotation of the chuck centrifugal forces act to move the jaw toward the workpiece further increasing the holding pressure and thus preventing separation at high speeds.

DESCRIPTION OF INVENTION

For a more detailed description of the invention, reference is made to the accompanying drawings in which:

FIG. 2 is a front elevational view of the chuck shown in FIG. 1;

FIG. 3 is an enlarged sectional view of a portion of the chuck looking along line 3—3 of FIG. 2

DETAILED DESCRIPTION OF THE PREFERRED EMBODIMENT

Figure 1:
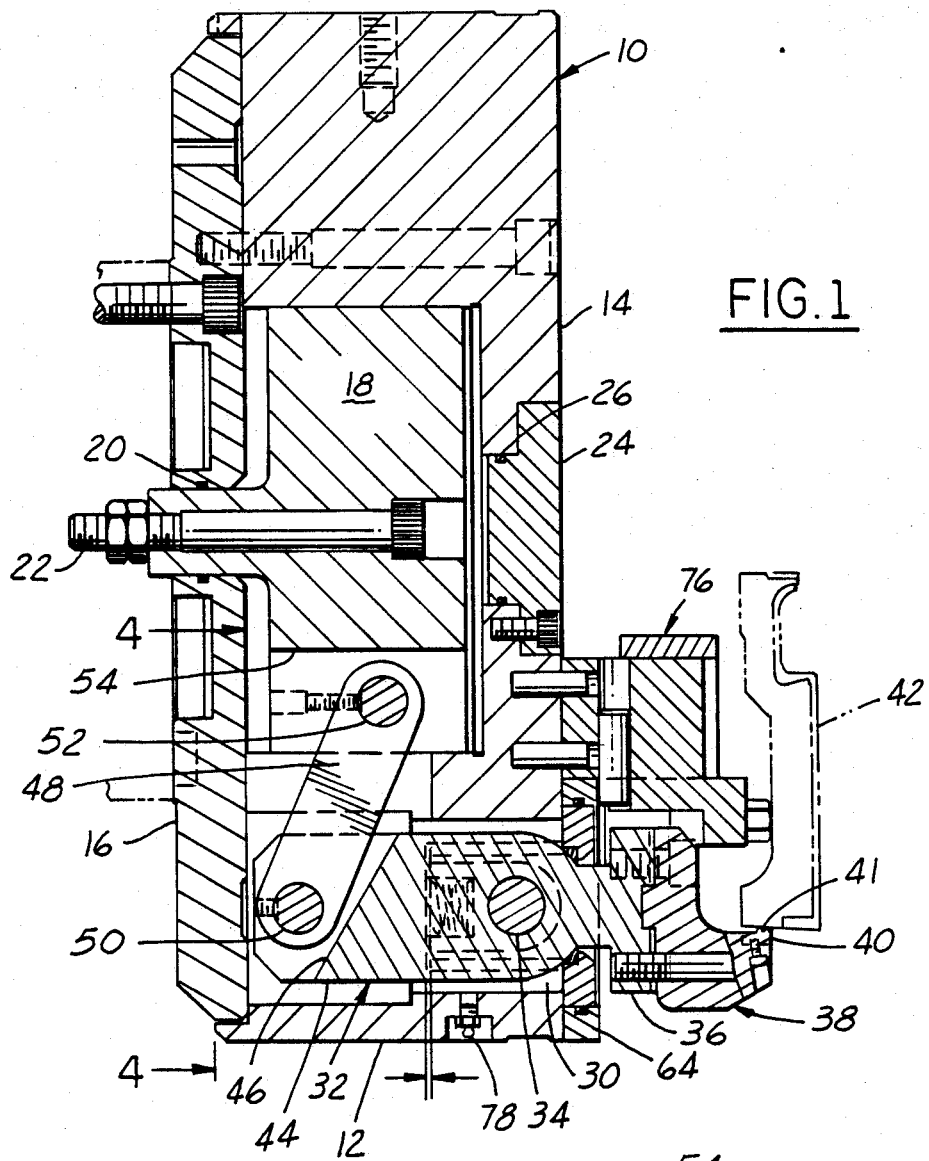
FIG. 1 is a sectional view of one embodiment of the chuck of this invention looking substantially along FIG. 1—1 in FIG. 2.
Figure 4:
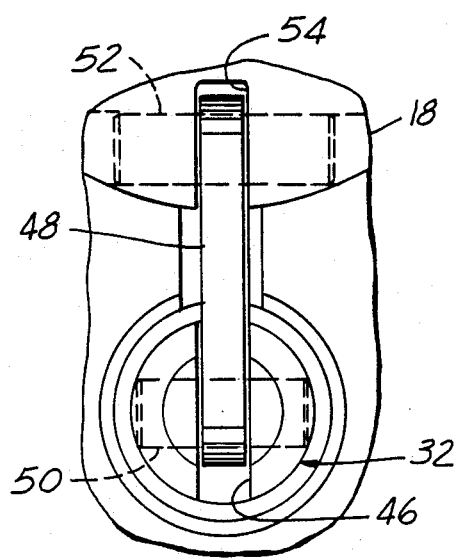
FIG. 4 is a rear view of the toggle linkage looking from line 4—4 shown in FIG. 1.

The chuck of this embodiment of the invention comprises a generally cup-shaped hollow body 10 having an annular generally cylindrical side wall 12 and a front face 14. The rear of the body 10 normally is closed by spindle adaptor 16. Centrally located openings are made in both the front face and spindle adaptor. Actuator 18 is placed within the cavity created by body 10 and adaptor 16 with a portion of the actuator extending rearwardly through the opening in the adaptor in a snug fit sealed by O-ring 20. A spindle 22 passes through the center of actuator 18. The central opening in the body is closed by cover 24 which is sealed by O-ring 26. The adaptor is fastened to the machine tool of spindle 22 by suitable means such as screws 28.

A series of three apertures 30 arranged concentrically around the axis of the chuck and spaced equi-distant apart. A rocker arm 32 extend through each of these apertures which is pivotably mounted at pin 34. On the frond end 36 of the rocker arm is mounted jaw 38 which has a carbide insert 40 with teeth 41, the teeth will hold a workpiece 42 partially shown in phantom outline in FIG. 1 during machining. Jaw 38 is removably joined to the end of the rocker arm so that different types of the jaws may be attached depending on the workpiece sought to be held. The rear end 44 of rocker arm 32 has a slot 46 extending through its rearmost portion. A toggle link 48 is placed through slot 46 and is joined to the rocker arm by pin 50. The other end of the toggle is placed within slot 54 of the adaptor and is connected to adaptor 18 by pin 52. The pivot point on the actuator and rocker arm are arranged so that rearward movement of the actuator normally results in movement of the jaw towards the workpiece (i.e., counter-clockwise as shown in FIG. 1).

As best shown in FIG. 3, pivot pin 34 is mounted on pivot carrier 58. Carrier 58 is mounted within a cavity 60 which is part of aperture 30. A ledge 62 extends from the sides of the cavity to provide a stop with respect to rearward movement of carrier 58. Enclosing the aperture is outer ring 64 and seal ring 66. A seal is completed between the outer ring 64 and the seal ring 66 by O-ring 68 and between ring 66 and the rocker arm 32 by neoprene seal 70. The carrier block is normally urged against rings 64 and 66 by spring 72 and 74. Mounted on the front face 14 of body 10 are stop assemblies 76 which aid in the placement of the workpiece. By use of a carrier block that encloses the pivot joint less contamination is encountered with respect to the prior art while only one side of the pivot moves as shown in U.S. Pat. No. 3,423,098.

The chamber formed by body 10 and adaptor 16 is partially filled with a lubricant such as oil and a drain plug 78 is provided in one side of the body 10 for removing and replacing lubricant. The lubricant acts to prevent wear and keep the pivots and other joints working properly.

In the operation of the chuck air or hydrauylic pressure is supplied to move actuator 18 forward. This movement of the actuator causes rocker arm 32 to move clockwise as shown in FIG. 1 by means of toggle 48, which acts to open jaw 38. A workpiece is then placed against stop assembly 76. Actuator 18 is then moved rearward which causes rocker arm 32 to pivot clockwise through operation of toggle 48, closing the jaw onto the workpiece.

If the teeth 41 contact the workpiece inwardly of a horizontal line extending through pivot 34, the jaw will securely hold the workpiece against the stop and all rotational movement of the rocker arm will stop. The workpiece is then stablized for machining to begin.

If, as shown in FIG. 1, the teeth first contact the workpiece outwardly from a horizontal line extending through pivot 34, rotation of the jaw will cause the jaw to firmly grasp the workpiece, but will also tend to move the workpiece slightly off the stop assembly 76 as pivoting of the rocker arm stops. This prevents precise alignment of the clamped workpiece. However, with this embodiment of the invention, actuator 18 will continue to move rearward. While further pivoting will not occur, the further movement of the actuator will cause rocker arm 32 and pivot 34 to move rearwardly with the actuator until the workpiece is again seated on stop assembly 76 by overcoming springs 72 and 74. Thus, precise alignment of the workpiece is assured.

During operation of the chuck, it is helpful that high speeds may be maintained so to increase effective rate of machining. With previous power chucks, there has been a tendency of the jaws to open since the rocker arm may freely pivot and the jaw would add such weight to have the center of gravity of the jaw, toggle, and rocker arm combination forward of the pivot point. The centrifugal forces acting on the center of gravity creates a clockwise rotation tending to open the jaws of the prior art. The invention features a design where the center of gravity 77 where the toggle-rocker arm-jaw combination is inward of the pivot. This creates a counter-centrifugal force so that much higher speeds may be maintained. Therefore, a 21-inch diameter speed of this embodiment can be safely operated at 1700 rpm as opposed to common operation at 600 rpm under the prior art. While the prior art would feature decreasing holding force with increased rotational speed, the current invention will create greater clamping forces as the rotational speed increases. In this embodiment, outside radius of the rocker arm is maintained constant rearwardly from the pivot pin to provide the additional mass necessary to provide a center of gravity rearward of the pivot point.

I claim:

1. A power chuck comprising:
   a support rotatable about a central axis having a forward end for holding a workpiece thereto for rotation around the axis;
   a plurality of rocker arms each having a first end, a second end and a pivot pin seat;
   jaw members mounted on said second ends of said rocker arms for engagement with the workpiece;
   actuation means mounted for reciprocation parallel to the axis of said support such that a clamping operation may be undertaken as the actuation means moves away from said forward end of the support;
   toggle levers pivotally connected to said actuation means and to the first ends of the rocker arm, said levers being operable by reciprocation of said actuation means to rock said arms on said pivot pin joints relative to said support so that the jaws are moved radially of said axis;
   pivot pin joints for each of said rocker arm so as to pivotally balance the rocker arms intermediate the ends thereof concentrically about the axis of the support including a pivot said, said support including a housing and a plurality of carriers corresponding to said rocker arms so that the pivot pin passes through the pivot pin seat of the rocker arm into said carrier members and the pivot pin seat surrounds the pivot pins in a constant seated relationship; and
   said carrier member movable relative to the housing but normally urged substantially along the central axis toward the support forward end by spring means such that the spring means may yield when said jaws engage a workpiece allowing the workpiece to be pulled towards said forward end during the clamping operation.

2. The power chuck of claim 1 wherein each of said rocker arms and its cooresponding toggle lever and jaw have a center of gravity located between said first end and said pivot pin joint.

3. The power chuck of claim 1 wherein the pivot pins are restrained against movement away from the central axis during rotation of the support.

* * * * *